United States Patent [19]
Haecker et al.

[11] Patent Number: 4,626,025
[45] Date of Patent: Dec. 2, 1986

[54] POWER OPERATED CLOSURE FOR VEHICLE ROOF OPENING

[75] Inventors: Walter Haecker, Hemmingen; Andreas-Uwe Nemenz, Rutesheim; Hans Weiner, Muehlacker, all of Fed. Rep. of Germany

[73] Assignee: Dr. Ing. H.c.F. Porsche Aktiengesellschaft, Weissach, Fed. Rep. of Germany

[21] Appl. No.: 606,576

[22] Filed: May 3, 1984

[30] Foreign Application Priority Data

May 5, 1983 [DE] Fed. Rep. of Germany ....... 3316406

[51] Int. Cl.$^4$ .............................. B60J 7/11; B60J 7/19
[52] U.S. Cl. .................................... 296/218; 296/223; 296/224; 307/10 R
[58] Field of Search ................ 296/216, 218, 221–224; 200/50 A; 180/286; 307/10 R

[56] References Cited

U.S. PATENT DOCUMENTS

| 2,182,426 | 12/1939 | Courcier, Sr. | 180/286 |
| 4,126,352 | 11/1978 | Vogel | 296/218 |
| 4,278,922 | 7/1981 | Grebe | 296/223 |
| 4,367,454 | 1/1983 | Modica | 180/286 |
| 4,403,805 | 9/1983 | Strem, Jr. | 296/221 |
| 4,420,185 | 12/1983 | Bienert et al. | 296/223 |
| 4,428,614 | 1/1984 | Vogel et al. | 296/218 |
| 4,438,972 | 3/1984 | Katayama et al. | 296/221 |
| 4,502,726 | 3/1985 | Adams | 296/221 |
| 4,548,439 | 10/1985 | Bienert et al. | 296/223 |

FOREIGN PATENT DOCUMENTS

| 3045364 | 7/1982 | Fed. Rep. of Germany | 296/223 |
| 3316406 | 10/1984 | Fed. Rep. of Germany | 296/223 |

Primary Examiner—Robert B. Reeves
Assistant Examiner—Dennis H. Pedder
Attorney, Agent, or Firm—Barnes & Thornburg

[57] ABSTRACT

A vehicle includes a sun-roof having a roof aperture closable by a hatch, wherein the hatch is movable by means of a power operated device between a canted position and a closed position and, in the closed position, is selectively lockable or unlockable. In the unlocked position of the device, the hatch can be removed.

In order to enhance comfort in operating the device and in order to securely hold the hatch in position in all operating conditions, an electric motor cooperating with transmitting elements is provided for operating the device, this motor being actuatable by means of a manually operable switch and, in dependence on the ignition lock position, by position switches, a hatch sensor switch, and by the vehicle speed.

7 Claims, 8 Drawing Figures

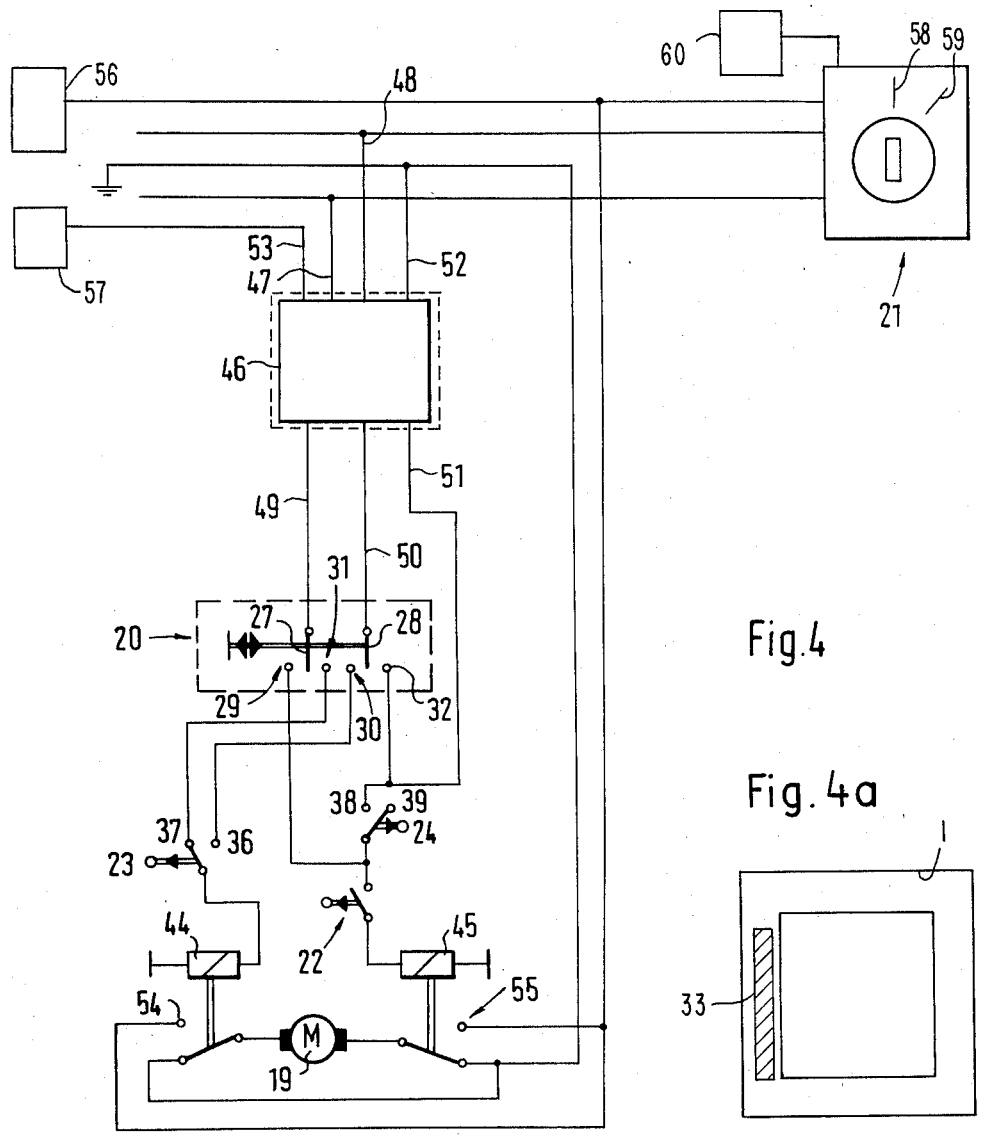
Fig.4
Fig.4a
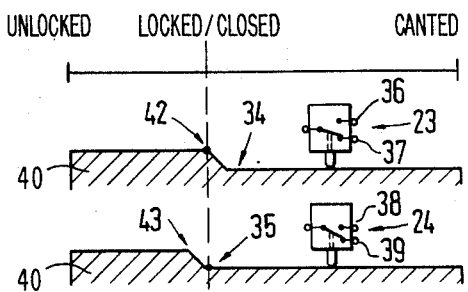
Fig.5

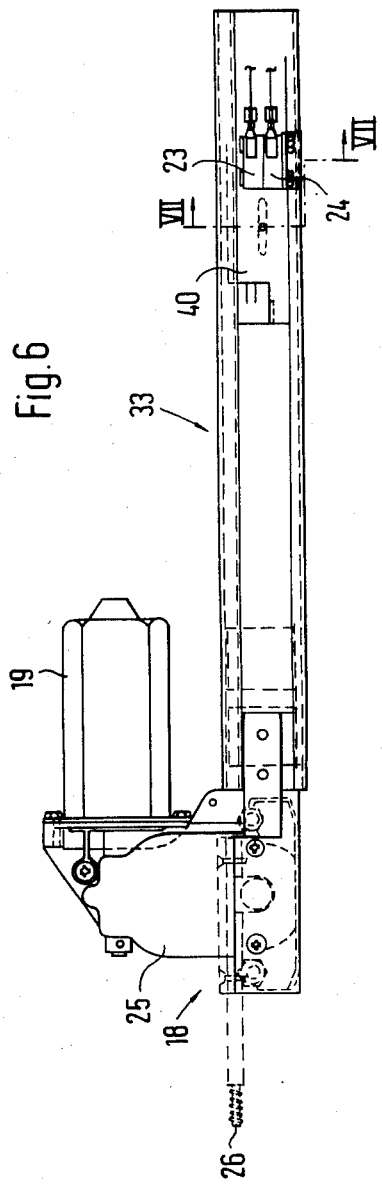
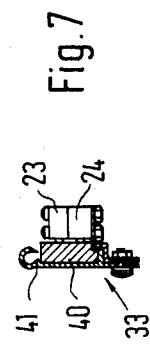

POWER OPERATED CLOSURE FOR VEHICLE ROOF OPENING

BACKGROUND AND SUMMARY OF THE INVENTION

The invention relates to a vehicle with a roof aperture or opening that can be closed by a closure, the closure or hatch being movable by means of a power operated element between an ajar or canted position and a closed position, the element being selectively lockable and unlockable to the closure in the closed position, and wherein the closure is removable from the opening with the element in the unlocked position.

In a conventional arrangement of the type disclosed in published German Application No. 30 45 364, the closure is operable by means of a hand crank cooperating with interposed force transmitting elements. This arrangement is undesirable in that manual operation of a hand crank is required for opening, closing, locking, and unlocking the hatch. Moreover, prior to unlocking, a safety catch must likewise be disengaged by hand.

It is an object of the invention to facilitate operation of the closure apparatus in such a way that is convenient yet maintains the lid securely held in place in all operating positions.

According to the invention, this object has been attained by providing a motor situated within the vehicle body connected to an element which is engagable with the closure. A control system is provided for controlling the motor which includes a manually operated control switch which functions with other switches to permit the closure to be moved by the motor and connecting mechanism between the closed and ajar positions. A closure sensor is provided to permit operation of the motor and connecting elements between a locked and an unlocked position only when the closure is situated in the opening, the closure being completely removable or replacable only when the connecting elements are in the unlocked position.

The advantages primarily obtained by the invention are simplicity of operation of the device made possible by the arrangement of an electric motor for driving the device as well as its actuation by a manual electric switch. The electric motor is preferably actuable in various positions based on the ignition lock position, the driving speed, and various mechanism position switches by which erroneous operation of the electric motor is avoided. The speed-dependent control of the electric motor causes the apparatus to be moved into the locked position when the hatch is unlocked and the ignition lock is in the position "ignition on." An undesired lifting of the lid or hatch during driving is thereby safely avoided.

The two position switches determine the locked position of the device when the latter is moved from the ajar or canted position toward locking and/or from unlocking toward locking. The two position switch operators or cams are such that only one position switch is operated at one time, whereby the electric motor is activated in only one direction. A sensor switch is closed only when the hatch is in place so that the electric motor is actuatable only in this position. The elements provided for controlling the electric motor are simple electric and electronic parts which can be readily mounted in the vehicle.

Additional features and advantages of the invention will become apparent to those skilled in the art upon consideration of the following detailed description of a preferred embodiment exemplifying the best mode of carrying out the invention as presently perceived. The detailed description particularly refers to the accompanying figures.

BRIEF DESCRIPTION OF THE DRAWINGS

FIG. 4 shows a wiring diagram for control and activation of the electric motor.

FIG. 4a shows a schematic top view of the present invention.

FIG. 5 shows a graphic representation of control functions of two position switches.

FIG. 6 shows an elevation view of the drive unit.

FIG. 7 shows a section along line VII—VII of FIG. 6.

DESCRIPTION OF PREFERRED EMBODIMENTS

Figure 1:
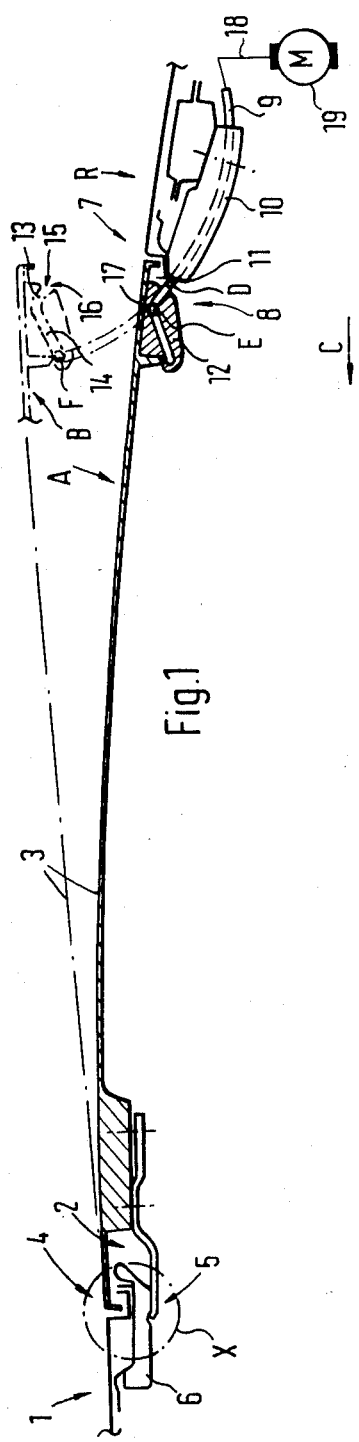
FIG. 1 is a longitudinal section through a vehicle roof with a lid that can be canted and removed.

In FIG. 1, numeral 1 denotes the roof of an automotive vehicle, especially a passenger automobile, exhibiting a roof aperture 2 closable by a hatch 3 commonly referred to as a sun-roof. The hatch 3 is equipped at its front edge 4 with plug-in members 5 forming a detachable, hinge-like pivotal connection with an adjoining roof frame 6 on the car body.

On the rear edge 7 of the hatch 3, a device 8 is provided between the hatch 3 and the roof 1, by means of which the hatch 3 can be moved from a closed position A—flush with the plane of the roof—into a canted position B indicated in phantom lines, wherein the hatch projects above the roof plane. Additionally, the hatch 3 can be selectively locked into or unlocked from its closed position A by means of the device 8. In the unlocked position, the hatch 3 can be removed from the roof aperture 2.

Figure 2:
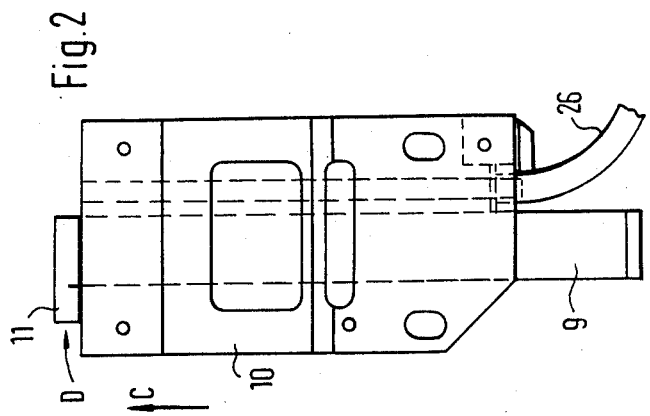
FIG. 2 is a partial view in the direction of arrow R in FIG. 1, rotated by 90 degrees.

The device 8 comprises an element 9 having the shape of an arc segment guided to be longitudinally displaceable in a sliding bearing 10 attached to the roof 1 (FIGS. 1 and 2). A lateral pivot 11 is fixed to the front end of the element 9 as seen in the driving direction C. This pivot 11 cooperates with a slotted guide means 12 arranged on the rear edge 7 of the hatch 3. The slotted guide means 12 comprises two guide sections 13 and 14 arranged at an angle to each other. The first guide section 13 extends obliquely from the bottom rear toward the top, and the second adjoining guide section 14 extends obliquely from the top toward the bottom front of guide means 12 (FIG. 1). The rear end 15 of the first guide section 13 has a cutout 16 through which the pivot 11 can be disengaged.

In the unlocked position, the pivot 11 is in the position D (FIGS. 1 and 2), i.e. the pivot 11 is disengaged from the slotted guide means 12. In the locked position, the pivot 11 assumes a position E lying approximately at the apex 17 of the two guide sections 13 and 14. With the hatch 3 displaced to a maximum extent (canted position B), the pivot 11 is in position F adjacent to the front end of the second guide section 14.

An electric motor 19, cooperating with force transmitting elements 18, is provided for operating the device 8. The electric motor 19 can be actuated by means of a manually operable switch 20. Actuation can depend on the position of an ignition lock 21, on the driving speed, on a sensor switch 22 for the hatch 3, and position switches 23 and 24 (FIGS. 3, 4, and 5).

The force transmitting elements 18 include at least one reduction gear 25 and a threaded rod or cable 26 (see FIGS. 2 and 6). The electric motor 19 operates the threaded cable 26 by way of the reduction gear 25, and the cable effects the desired adjusting movement of the element 9. The threaded cable 26 is firmly joined on one of its ends with the arcuate-segment-shaped element 9.

The switch 20 is a double pole, double throw switch arranged, for example, on the central console or at the dashboard of the automobile. The switch 20 includes two center contacts 27 and 28 which, in their rest condition, assume a no-contact central position. The contacts 27 and 28 can be applied selectively either to the fixed contacts 29 and 30, or to the likewise fixed contacts 31 and 32 of the switch 20. Contact 29 is associated with the function "cant", contact 30 with the function "unlock", contact 31 with the function "close", and contact 32 with the function "lock" (FIG. 4).

Figure 3:
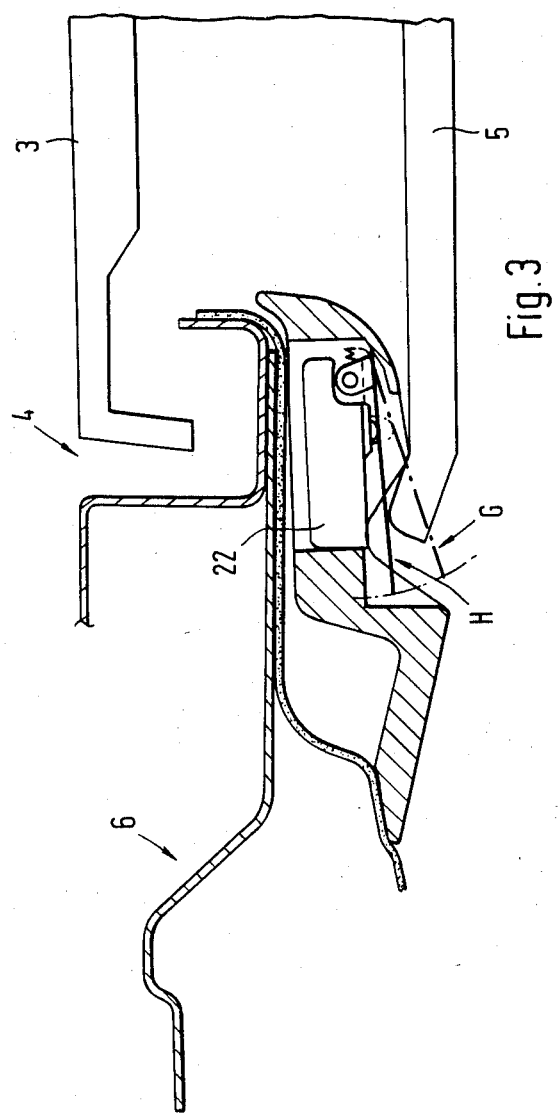
FIG. 3 shows a detail cross section of FIG. 1 on an enlarged scale.

The sensor switch 22, fashioned as a simple pressure switch, is provided at a roof section, preferably on the underside of the roof frame 6 (FIG. 3). With the hatch 3 removed, the switching reed of the pressure switch is in the lower position G shown in phantom lines. With the sensor switch 22 not depressed, and hence open, the current flow to the electric motor 19 is interrupted. With the hatch 3 inserted, the switching reed is pivoted upwardly by the plug-in member 5 of the hatch 3 to position H, and thus the sensor switch 22 is depressed and the switch contacts are closed. Actuation of the electric motor 19 is possible only with the hatch sensor switch 22 being closed.

The two position switches 23 and 24 are arranged on a switch bar 33 fixedly mounted to the car body side (See FIG. 4a) and are switched by movable control cams 34 and 35. The graphic illustration of FIG. 5 shows the control of position switches 23 and 24 as a function of the position of the element 9. The entire progression of motions of the element 9 and device 8 corresponds to the horizontal path between "locked" and "canted." The "locked" position and "closed" position, respectively, are characterized by the single dashed, vertical line.

The single pole, double throw position switch 23 cooperates with the switching cam 34. The switch 23, while depressed between the "unlocked" and "locked" positions, is applied against contact 36. In contrast, the switch 23 is released shortly after the "locked" position and is applied against contact 37 while moving in the direction of the "canted" position, remaining in this position until the maximum canted position B is reached.

The other single pole, double throw position switch 24 operated by the switching cam 35 is applied against contact 38 between the "unlocked" position up to shortly before the "locked" position. In the "locked" position, the position switch 24 is already released to apply to contact 39 and retains this position until the maximum canted position B is reached.

The control cams 34 and 35 exhibit a stepped configuration and are provided on a rail 40. The rail 40 is arranged to be longitudinally displaceable in a guide section 41 of the switch bar 33. An end of the rail 40 is connected to the threaded cable 26.

The switching points 42 and 43 of the two control cams 34 and 35 are arranged in offset relationship to each other so that in all cases only one position switch 23 or 24 is activated at a time, and accordingly, clear control of the electric motor 19 is effected. The two position switches 23 and 24 act so that, with the position of the ignition lock remaining the same, the device 8 cannot be moved from "canted" by way of "lock and/or close" toward "unlock." Rather, the adjusting motion from "canted" to "close" is always completed in locked position E.

The direction of rotation of the electric motor 19 is determined by the position switches 23 and 24, the hatch sensor switch 22, and by relays 44 and 45. The relay 44 is connected to position switch 23 and becomes effective during unlocking and closing. The other relay 45 is connected via the sensor switch 22 with the position switch 24 and is operated during locking and canting.

In the illustrated embodiment, an electronic switching means 46 is arranged between the ignition lock 21 and the manual switch 20. The electronic switching means 46 is of conventional design and comprises logic gates, for example. This switching means 46 is connected via input lines 47 and 48 to the ignition lock 21, and via output lines 49, 50, and 51 to the manual switch 20. Still other input lines 52 and 53 are provided at the switching means 46. The input line 52 is connected to ground and the input line 53 connects the Hall generator 57 of a tachometer or speedometer with the switching means 46. The output line 49 is connected to the center contact 27 while the output line 50 is connected to the other center contact 28 of the manual switch 20. The output line 51 is arranged between the switching means 46 and the fixed contact 32 of the manual switch 20.

The top line shown in FIG. 4 connects the ignition lock 21 to the source 56 of electrical power within the vehicle. The ignition lock has a key inserted sensor 60 and means for permitting the operation of the motor 19 only when the key inserted sensor 60 is actuated. With the ignition lock 21 being in the position "ignition key inserted" 58, a positive potential is present merely at the input line 47 (radio contact). Whereas, with the ignition lock being in position "ignition on" 59, current flows through the input lines 47 and 48.

The switching means 46 controls the current supplied to the output lines 49, 50, and 51. The output line 49 conducts current from the ignition lock being in position "ignition on 59." With the ignition lock position "ignition key inserted" 58, however, positive potential is applied only to the output line 50. In the output line 51, current flows at a selected minimum driving speed, for example, 5 km/h.

The hatch 3 can be removed solely with the ignition lock in the "ignition key inserted" 58 position, that is, with the ignition key placed in position and the ignition off. With the ignition key being in the position "ignition on" 59, the hatch can be canted or closed but not removed. Furthermore, the inserted and unlocked hatch 3 is forcibly locked with an ignition lock position of "ignition on" 59 starting with a selected driving speed, for example, 5 km/h.

The electronic switching means 46 could be omitted (as shown by the phantom lines around electronic switching means 46) by using an ignition lock 21 exhibiting, besides the radio contact and the contact "ignition on" 59 also an additional buzzer contact. In this case, the output line 50 is connected directly to the buzzer contact of the ignition lock 21 and the output line 49 is connected to the contact "ignition on" 59 of the ignition lock 21. The output line 50 then is conductive only with the ignition key inserted, and with the ignition not being turned on, whereas positive potential is applied to the output line 49 with the ignition being turned on. For the speed-dependent actuation of the electric motor (without the switching means 46), the contact 32 is connected via the output lines 51 to a tachometer or speedometer which transmits a positive signal to the output line 51 at a selected speed. The aforedescribed actuation without switching means 46 while not illustrated in detail is within the intended general scope of the present invention.

For locking and unlocking the inserted hatch 3, the ignition key is placed into the ignition lock 21, and the ignition is not turned on, thus the ignition lock position is "ignition key inserted 58." Thereby, the line 50 connected to manual contact 28 can conduct current. During the unlocking operation, the contact 28 is placed against contact 30 by manually operating the switch 20, and current flows to the relay 44 via the contact 36 of the end position switch 23. The relay attracts contact 54 and activates the electric motor 19 which moves the device 8 in the direction toward "unlocking."

If the hatch 3, which is put in place and unlocked, is to be locked again, the manual switch 20 is pressed in the direction "lock" whereby the central contact 28 is placed in contact with contact 32. With the position switch 24 depressed (contact 38), current flows via the closed hatch sensor switch 22 to the relay 45. The latter attracts contact 55 and sets the electric motor 19 in motion in the direction toward "locking." The electric motor 19 runs as long as the manual swich 20 is operated and/or until the position switch 24 is released by the control cam 35 starting with switching point 43, the position switch 24 being released and applied to contact 39.

For canting and closing the inserted lid 3, the ignition is turned on whereby the output line 49 becomes conductive. If the closed hatch 3 is to be canted, the manual switch 20 is moved in the direction toward "cant." Thereby the central contact 27 lies against contact 29 and current flows by way of the closed hatch sensor switch 22 to the relay 45. The latter attracts contact 55 and thereby drives the electric motor 19 in the direction toward "cant", for such time as the manual switch 20 is operated and/or until a mechanical stop, not shown in detail, terminates the adjusting motion.

For closing the canted hatch 3, the manual switch 20 is urged into the other direction so that the central contact 27 is applied against contact 31. Current then flows via the contact 37 of the position switch 23 to the relay 44. The latter attracts contact 54 whereby the electric motor 19 is driven and moves the hatch 3 in the direction toward "closing". The closing motion is terminated by actuation of the position switch 23 and/or by releasing the manual switch 20.

If the hatch 3 is put in place and unlocked, and if ignition is immediately turned on, then locking of the hatch 3 by operating the manual switch 20 is no longer possible. In this case, the hatch 3 is automatically locked by means of the device 8, starting with the preselected driving speed. For this purpose, current flows through line 51 to the contact 38 of the position switch 24, starting with the selected driving speed and further via the closed hatch sensor switch 22 to the relay 45. The latter attracts and sets the electric motor 19 in motion, whereby the device 8 is moved from the position "unlocked" into position "locked."

Although the invention has been described in detail with reference to certain preferred embodiments and their operational modes, variations and modifications exist within the scope and spirit of the invention as described and as defined in the following claims.

What is claimed is:

1. A power operated closure arrangement for an opening in a roof of a motor vehicle comprising:
   a motor situated within the vehicle body;
   a closure member for selectively covering the opening in the roof;
   an element movable between a locked position and an unlocked position by the motor and which is engageable and disengageable by the motor with the closure member for locking the closure member to said vehicle and for moving said closure member between a closed position and a canted position;
   a control system for controlling the motor and controlling the movement of said element, and
   sensing means for permitting said element to move between the locked position and the unlocked position only when the closure member is situated in said opening, the closure member being completely removable from the vehicle and replaceable into the opening only when said element is in the unlocked position.

2. The apparatus of claim 1, wherein said sensing means comprises a normally open switch provided at a section of the motor vehicle roof, the switch being closed by the pressure of the closure in the opening so as to permit actuation of the motor.

3. The apparatus of claim 1, wherein the control system includes a plurality of switches for controlling operation of the motor.

4. The apparatus of claim 3, wherein the switches are attached to a switch bar mounted on a side of the motor vehicle, and cam surfaces are provided on a rail supported for slideable movement through a guide section of the switch bar, said rail sliding in relation to movement of said element by the motor, thereby controlling actuation of the switches.

5. The apparatus of claim 1 further comprising relays for connecting the motor to a source of electrical power, and means connecting the relays to a manually operated switch for controlling the direction of rotation of the motor.

6. The apparatus of claim 1 further comprising a ignition lock having an on position, a sensor of vehicle speed, and means requiring the operation of the motor to shift said element to locked position when the vehicle attains a preselected speed.

7. The apparatus of claim 1 further comprising an ignition lock having a key inserted sensor and means for permitting the operation of the motor only when the key inserted sensor is actuated.

* * * * *